June 17, 1969  J. L. GRATZMULLER  3,450,109
SUPERCHARGED DIESEL MOTORS
Filed Jan. 30, 1967

United States Patent Office 3,450,109
Patented June 17, 1969

3,450,109
SUPERCHARGED DIESEL MOTORS
Jean Louis Gratzmuller, 66 Bd Maurice Barres, Hauts-de-Seine, Neuilly-sur-Seine, France
Filed Jan. 30, 1967, Ser. No. 612,394
Claims priority, application France, Feb. 3, 1966, 48,222
Int. Cl. F02m *31/14;* F02b *3/08*
U.S. Cl. 123—27      4 Claims

ABSTRACT OF THE DISCLOSURE

A supercharged diesel motor in which the supercharging is activated by the motor and the air is supplied to the motor cylinders at a pressure higher than that of the atmosphere. The air is heated before admittance to the cylinders and the temperature of the air is regulated and the heating and cooling is controlled for maintaining the temperature at a level appreciably constant whatever the external atmospheric temperature and pressure, the speed of the motor and its load conditions.

---

This invention relates to supercharged diesel motors and more particularly to a method and means to provide greatly increased nominal power in relation to that of existing motors, and at the same time improving the functioning of the motor at low speeds and loads.

The invention relates more especially, but not exclusively to high-powered motors such as those used in diesel locomotives, in generating plants and on ships.

An object of the present invention is to increase, at equal capacity, the power of supercharged diesel motors, and it further envisages diesel motors with increased power made in accordance with the invention.

A further object of the present invention is to increase the maximum power of supercharged diesel motors, and this further envisages new supercharged diesel motors with a greater power-to-weight ratio.

It is known that one of the main characteristics of internal combustion engines of the diesel type is their relatively high compression ratio, which is required in order to raise adiabatically the temperature of the air contained in the cylinders, in the final compression stage, to a value high enough to allow, under all current conditions, the ignition of the liquid fuel injected into the cylinders.

This compression ratio is, for example, between 13 to 20, depending on the type of motor and fuel used.

It is further known that it has been possible in great proportion to increase the power of these motors, due to supercharging supplied by a compressor, generally a turbocompressor, driven by the motor. It is thus possible to introduce a greater mass of combustion-air into the cylinders. In order to attain relatively high supercharging values, for example 2 to 3, used on modern diesel motors of high power (e.g. 2 to 300 h.p.) it is necessary, before introducing the air into the cylinders, to cool it by passing it through one or two coolers. In effect, the air heats up by compression in the compressor and it is of advantage to cool it in order to increase the mass of air introduced into the cylinders, as well as to maintain a suitable temperature level in the cycle.

However, the supercharging values cannot be increased indefinitely, because, with heavily supercharged motors, the abovementioned characteristic fixing the compression ratio without supercharging subsists, and, at full power, excessive pressures would be given, which the component parts of the motor could not withstand. In other words, since the air drawn into the cylinder by the piston must be compressed by the piston to such a degree as to cause ignition of the fuel, a highly compressed supercharging air added to such normally compressed air would produce an excessive total air pressure within the cylinders.

The inventive method provides an increase in the maximum power in comparison to a normal diesel motor at the same time giving satisfactory running conditions at low speeds, at low power and on starting. The method comprises, increasing, in a proportion substantially equal to the desired increase in power, the volume of the compression chambers of the cylinders of the motor, reducing the compression ratio without changing the capacity; consequently increasing the pressure of the air-supply to the cylinders by means of the compressor system; regulating, by heating and cooling, the temperature of the air at a substantially constant level, whatever the working conditions of the motor; and substantially increasing, in said proportion, the amount of fuel injected into the cylinders at each cycle.

In a motor in accordance with the invention, the characteristic of normal diesel motors, which has been mentioned above, i.e., the fact that the compression ratio is too low to allow the normal functioning of the motor on starting, at slow speeds or with low loads, when it is fed with air at the normal temperature of the surroundings, is no longer taken into account.

The present invention is directed to a supercharged diesel motor comprising means for supercharging, activated by said motor, means for supplying air to the cylinders of said motor at a pressure higher than that of the atmosphere, means for heating the air admitted to the cylinders of said motor, means for cooling said air, and means for regulating the temperature of said air and controlling said heating and cooling means in order to maintain said temperature at a level which is appreciably constant whatever the external atmospheric temperature and pressure, the speed of the motor and its load conditions.

The air admitted into the cylinders is heated when the effective pressure of supercharging is nil, or very low (at starting and at low running speeds) while this air is cooled when the supercharging pressure is high. The means for regulation keeps the air admitted into the cylinders constantly at a temperature located between a minimum temperature ensuring the ignition of the fuel injected in the final compression stage when the motor is functioning at reduced power, and a maximum temptrature ensuring a suitable supply of air when the motor is working at full power at the maximum supercharging pressure.

An embodiment of the present invention will now be described, by way of example, with reference to the accompanying drawings, in which.

Figure 1:
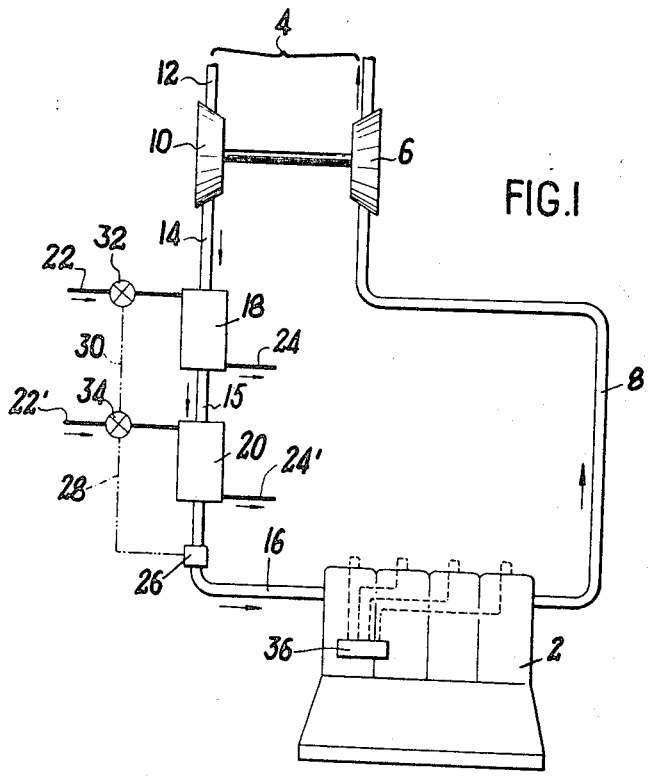
FIG. 1 is a diagrammatic view of supercharging means according to the invention.

Referring to the drawings, a diesel motor 2 comprises a supercharging compressor ssytem 4, defined by, e.g., a turbine 6 whose inlet is joined to an exhaust pipe 8 of the motor, and which is coupled mechanically to a compressor 10 of one or more stages. This compressor, when it is driven by the turbine 6, draws in air from the atmosphere through a compressor inlet 12 and compresses it into a conduit 14 which communicates with an inlet conduit 16 of the motor 2. Between the conduits 14 and 16 there are inserted, in accordance with the invention, a heating means 18 and a cooling means 20 connected by a conduit 15.

In practice, the heating and cooling means are preferably combined into a single arrangement, and if necessary, with several stages, but for reasons of clarity they are described as being independent.

The heating and cooling means are made up of two heat-exchangers 18 and 20, such as radiators, whose function is to maintain the temperature of the air admitted to the motor at an appreciably constant value, located between two values, for example, $T_1$ and $T_2$.

A heat-carrying fluid, such as water, at a temperature above $T_1$, can circulate in the exchanger 18, and is introduced therein by a pipe 22. The fluid leaves via a pipe 24. In the exchanger 20, or cooling exchanger, a heat-carrying fluid, such as water, can circulate, at a temperature lower than $T_2$. This fluid arrives through a pipe 22' and leaves by a pipe 24'.

The systems for heating the heat-carrying fluid to the required temperature, and for circulating this fluid, have not been shown in FIG. 1, but are systems well known in the central heating industry or in the technology of cooling internal combustion engines.

From this point it can be seen that if the interval $T_1$–$T_2$ of the temperatures is suitably chosen, it will be possible to combine the two exchangers just described so that only one is necessary.

The motor 2 includes means 26 for regulating the temperature of the air admitted into the cylinders. These means 26 comprise, for example, a detector unit sensitive to the temperature of the air admitted (or to the temperature of a fluid whose temperature varies like that of the air admitted) and a control device acting selectively on the exchangers 18 and 20. In FIG. 1, this control device acts, through connections 28 and 30, on valves 32 and 34 respectively inserted in the feed-pipes 22 and 22' of the exchangers 18 and 20.

Apart from these different elements, the motor according to the invention has other notable points in comparison with a normal supercharged diesel motor:

(1) Its compression ratio is lower than that currently used, e.g., below 12, while compression ratios chosen currently for high-power motors are from 14 to 20:

(2) The supercharging values supplied by the compressor system 4 are higher than on existing motors, being, for example, higher than 3, whereas this value is practically never passed on current motors;

(3) An injection system 36 on the motor allows injection into each cylinder, at each cycle, of a larger amount of fuel than in a diesel motor or normal construction.

The users of diesel motors demand that the motor be able to start at a certain minimum temperature of the external atmosphere, e.g., the International Railway Union demands easy starting at +5 degrees C. whatever may be the season or the country, the low compression ratio of a motor according to the invention will not allow the introduction of air by adiabatic compression into the cylinders at a temperature which will allow normal ignition of the fuel. Thus the air admitted must be heated at starting and at low speeds, by means of the exchanger 18, up to the temperature $T_1$, e.g., higher than 60 degrees C., allowing ignition of the fuel.

Figure 2:
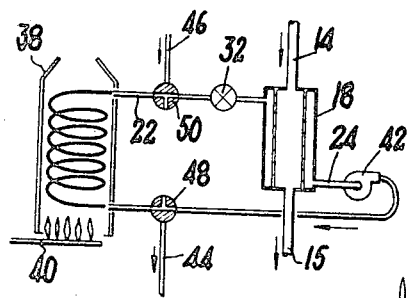
FIG. 2 is a diagrammatic view of an embodiment of the means for heating the air admitted into the cylinders of the motor.

The air/water exchanger 18 is provided with water-heating means, functioning independently of the motor and shown diagrammatically in FIG. 2. This means comprises a boiler 38 heated by a burner 40, and an electric circulating pump 42, fed by the motor's battery or by the supply circuit, with this circuit being connected to the inlet 22 and the outlet 24 of the exchanger 18. The hot water in this circuit can likewise, if desired, heat the motor before starting by passing into its cooling circuit. Once the motor is working and is warm, the boiler 38 can be stopped, with the circuit of the exchanger 18 being then connected to the cooling circuit 44–46 of the motor by suitable valves 48–50, which can be activated automatically by a suitable thermostatic device.

During this heating stage for the air admitted, before starting, the second exchanger 20 can likewise be used, as a heater, by circulating therethrough the hot water from the boiler and by connecting its outlet 24' to the inlet 22 of the exchanger 18.

In a modification, the heating means functioning independently of the motor can be constituted by a burner directly heating the air in the exchanger 18. The air-supply is then charged with the products of combustion, from the burner, but this does not present any inconvenience, because, at starting and at low speed, the combustion-air admitted into the cylinders is present in abundance in relation to the amount of fuel injected under these conditions.

The air-supply being thus heated to the temperature $T_1$, for example between 60 and 80 degrees C. approximately, the motor can start and turn over at low speed without oiling up.

As the speed and the load of the motor increase, the compressor 10 begins to emit air, and to heat this air. The temperature-regulation system 26 thus progressively reduces, e.g., by closing of the hot water entry valve 32, the amount of heat imparted by the exchanger 18 to the air admitted.

For a given range of the speed of the motor, and for a given ambient temperature, the compressor 10 supplies the supercharging air at a pressure $p$ and at a temperature located between $T_1$ and $T_2$, so that the exchangers 18 and 20 no longer need to deliver or to extract calories from the air admitted. Below this area, the compressor supplies air at high pressure, at a temperature higher than $T_2$ and the cooling exchanger 20 comes into action, as is usual in supercharged motors, in order to increase the mass of air admitted into the cylinders and to maintain the level of the temperature of the cycle at a suitable value.

In practice, the temperature-regulation system 26 preferably measures the temperature of the cooling-water or the heating-water rather than that of the air admitted into the cylinders, so as to achieve a more stable function.

A motor as hereinbefore described functions essentially like a normal motor, up to a power appreciably identical to that of a normal motor of equal capacity, except for the fact that it can start easily at low temperatures, work at a slow speed without inconvenience, due to the heating-system for the air admitted, and is supplied with air which is at a constant temperature.

Figure 3:
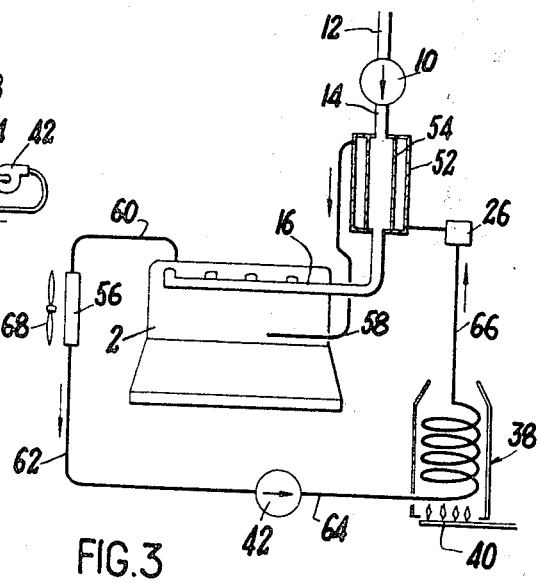
FIG. 3 is a diagrammatic view of another embodiment which comprises only a single heat-exchanger to ensure either the heating or the cooling of the air fed to the motor.

FIG. 3 shows diagrammatically a diesel motor according to the invention in which the air-supply to the motor, drawn in from the atmosphere by an air-intake 12 and compressed by a compressor 10 of one or several stages, is heated or cooled depending on circumstances by passage into a single heat-exchanger 52, and if necessary of several stages, which is inserted between the motor's air-supply pipes 14–16.

The exchanger 52 encloses the water-circuation tubes, shown by a jacket 54, which are connected to the normal water-cooling-circuit of the motor 2. This cooling circuit comprises, as is usual, a radiator 56, a circulating pump 42, feed- and take-off pipes 58–60 for the water to the motor's water-jackets, and connecting pipes 62–64–66.

Into this circuit is inserted a boiler 38, similar to that of FIG. 2, for heating the water in the circuit, and in consequence the air-supply during its passage into the exchanger 52, as long as this air is at a temperature lower than the aforementioned limit $T_1$.

In order to regulate the temperature of the air admitted between the values $T_1$ and $T_2$ aforementioned, for example, between 80 and 115 degrees C. in the example selected, the temperature of the water circulating in the exchanger 54 and in the motor is regulated between two values $T'_1$ and $T'_2$ which have been selected, with the area of adjustment of the water being, for example, from 85 to 100 degrees C. at the inlet to the exchanger in the example selected.

This regulation of the water-temperature is effected by a thermostatic device 26 adapted, e.g., to control the activation or deactivation of a ventilator or fan 68 of the radiator 56, the activation or deactivation of the boiler 38, the disconnection of the certain parts of the circuit by the maneuvering of suitable valves, and any other operation which is current in known temperature-regulation systems.

According to the arrangement shown in FIG. 3, a motor group can be assembled, notably for a diesel locomotive, in which the water circuit of the heat exchanger 52 is common with the motor's water cooling-circuit, due to which the locomotive comprises only one single water circuit, with one single radiator or a single series of radiators, for the heating and cooling of the air-supply as well as for the motor.

What is claimed is:

1. A supercharged diesel motor comprising a closed water cooling circuit for the motor, means driven from the motor for supplying air to the cylinders of the motor at a pressure higher than that of the atmosphere, conduit means for leading said air to the motor, heat exchanger having a first component located in the conduit means and a second component located in the closed water circuit, at least one element sensitive to the temperature of the water cooling circuit, regulating units for heating the water in the cooling circuit and for cooling the water respectively, and said units being operative in response to said sensitive element for causing the water to raise the temperature of the air introduced into the cylinders to or maintain the same between valves, the lower of which corresponds to a temperature such that the compression end temperature within the cylinders of the engine is at least as high as the spontaneous ignition point of the injected fuel.

2. The motor as claimed in claim 1 particularly for a diesel locomotive whereby the locomotive includes only a single water circuit and a single series of radiators for heating and cooling the motor as well as the air supply.

3. A method of increasing the maximum power of a supercharged compression-ignition engine of given capacity and having a compression ratio above 12/1 with the engine including a closed cooling fluid circuit, comprising the steps of reducing the compression ratio to a fixed value below 12/1, operating the engine by employing a supercharge ratio up to above 3/1 and increasing the quantity of injected fuel in conformity with the increased weight of supercharging air introduced into the cylinders of the engine, cooling the supercharging air by heat-exchange relationship with the fluid circulating in the closed cooling fluid circuit, and heating the fluid when the compression end temperature within the cylinders of the engine approaches being less than the spontaneous ignition temperature of the injected fuel.

4. A supercharged compression-ignition engine of the type having a fixed compression ratio of less than 12/1, comprising a close cooling liquid circuit, means driven from the engine for supplying the latter with supercharging air at a supercharge ratio of above 3/1, conduit means for conducting the air to the engine, a heat-exchanger having a first compartment interposed in the conduit means and a second compartment interposed in the closed cooling liquid circuit, thermostatic means sensitive to the temperature of the closed cooling liquid circuit, controllable means for heating the liquid in the closed cooling liquid circuit, and controllable means for cooling the liquid, said heating means and said cooling means being operative responsive to the thermostatic means for causing the liquid to raise the temperature of the air introduced into the cylinders of the engine to or maintain the same between limit values, the lower of which corresponds to a temperature such that the compression end temperature within the cylinders of the engine is at least as high as the spontaneous ignition point of the injected fuel.

References Cited
UNITED STATES PATENTS

| | | | |
|---|---|---|---|
| 2,216,494 | 10/1940 | Kurtz et al. | 60—13 |
| 2,558,797 | 7/1951 | Theiss | 60—13 XR |
| 2,635,698 | 4/1953 | Nettel | 60—13 |
| 3,257,797 | 6/1966 | Lieberherr | 60—13 |

WENDELL E. BURNS, *Primary Examiner.*

U.S. Cl. X.R.

60—13; 123—119, 122 142.5